US011940128B2

(12) United States Patent
Burmeister et al.

(10) Patent No.: US 11,940,128 B2
(45) Date of Patent: Mar. 26, 2024

(54) MODULAR LED LIGHT

(71) Applicant: Eaton Intelligent Power Limited, Dublin (IE)

(72) Inventors: Jens Burmeister, Eberbach (DE); Bernd Schwarz, Eberbach (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/660,566

(22) Filed: Apr. 25, 2022

(65) Prior Publication Data

US 2022/0243899 A1 Aug. 4, 2022

Related U.S. Application Data

(63) Continuation of application No. 16/768,757, filed as application No. PCT/EP2018/025302 on Nov. 28, 2018, now Pat. No. 11,333,325.

(30) Foreign Application Priority Data

Dec. 1, 2017 (DE) ..................... 10 2017 128 620.9

(51) Int. Cl.

*F21V 15/01* (2006.01)
*F21S 2/00* (2016.01)
*F21V 1/22* (2006.01)
*F21V 17/00* (2006.01)
*F21V 17/12* (2006.01)
*F21V 19/00* (2006.01)

(Continued)

(52) U.S. Cl.

CPC .............. *F21V 15/01* (2013.01); *F21S 2/005* (2013.01); *F21V 1/22* (2013.01); *F21V 17/002* (2013.01); *F21V 17/12* (2013.01); *F21V 19/003* (2013.01); *F21V 23/009* (2013.01); *F21V 23/06* (2013.01); *F21V 25/12* (2013.01); *F21V 29/74* (2015.01);

(Continued)

(58) Field of Classification Search

CPC ............................... F21V 25/12; F21V 23/008
See application file for complete search history.

(56) References Cited

U.S. PATENT DOCUMENTS

| | | | |
|---|---|---|---|
| 6,264,348 | B1 | 7/2001 | Ellis |
| 2010/0315252 | A1 | 12/2010 | Desphande et al. |

(Continued)

FOREIGN PATENT DOCUMENTS

| | | | |
|---|---|---|---|
| CN | 201425234 | Y | 3/2010 |
| DE | 102012101411 | A1 | 8/2013 |

(Continued)

OTHER PUBLICATIONS

International Search Report and Written Opinion for PCT Application No. PCT/EP2018/025302, dated Feb. 1, 2019, 9 pages, Rijswijk, Netherlands.

*Primary Examiner* — Eric T Eide
(74) *Attorney, Agent, or Firm* — Stinson LLP

(57) ABSTRACT

A modular LED light for explosive areas includes a housing module including a central power supply module, at least one LED module receiving element, and an LED power supply interface arranged in the LED module receiving element such that the LED power supply interface is in the housing module. At least one LED module is configured to be detachably attached to the housing module. The LED power supply interface supplies electrical power to the at least one LED module when the at least one LED module is attached to the housing module in a usage positon.

20 Claims, 8 Drawing Sheets

(51) Int. Cl.

| | |
|---|---|
| ***F21V 23/00*** | (2015.01) |
| ***F21V 23/06*** | (2006.01) |
| ***F21V 25/12*** | (2006.01) |
| ***F21V 29/74*** | (2015.01) |
| ***F21Y 107/80*** | (2016.01) |
| ***F21Y 115/10*** | (2016.01) |

(52) U.S. Cl.
CPC ....... *F21Y 2107/80* (2016.08); *F21Y 2115/10* (2016.08)

(56) References Cited

U.S. PATENT DOCUMENTS

| | | | |
|---|---|---|---|
| 2011/0032696 | A1 | 2/2011 | Kim et al. |
| 2012/0099317 | A1* | 4/2012 | Liu ....................... F21V 23/023 362/249.02 |
| 2012/0218758 | A1 | 8/2012 | Wang et al. |
| 2013/0033195 | A1* | 2/2013 | Liao .......................... G09F 9/33 362/183 |
| 2014/0347853 | A1* | 11/2014 | Avina .................... F21V 19/003 362/240 |
| 2016/0327256 | A1 | 11/2016 | Hall |
| 2016/0356475 | A1 | 12/2016 | Honda et al. |
| 2017/0307149 | A1 | 10/2017 | Clark et al. |
| 2017/0307204 | A1 | 10/2017 | Cattoni |
| 2020/0011520 | A1 | 1/2020 | Naumann et al. |

FOREIGN PATENT DOCUMENTS

| | | | |
|---|---|---|---|
| DE | 102014214816 | A1 | 2/2015 |
| DE | 102015003114 | A1 | 9/2016 |
| EP | 3217074 | A1 | 9/2017 |

* cited by examiner

MODULAR LED LIGHT

CROSS-REFERENCE TO RELATED APPLICATIONS

This application is a continuation of U.S. patent application Ser. No. 16/768,757, which was filed Jun. 1, 2020, which is a US National Stage Application of International Application No. PCT/EP2018/025302, filed Nov. 28, 2018, which claims the benefit of DE 10 2017 128 620.9 filed Dec. 1, 2017, all of which are incorporated herein by reference in their entirety for all purposes.

BACKGROUND

The invention relates to a modular LED light that is intended to replace, for instance, a fluorescent light or the like. Such a light has a plurality of light-emitting diodes (LEDs). As a rule, in previous LED lights of this type a continuous housing and a continuous cover for all parts of the light were used. Because of this, changes to the light were relatively complex, since, for example, the entire cover had to be removed. Moreover, it was a drawback of the known lights that they were not very flexible with respect to the arrangement of the LEDs.

The underlying object of the present invention is to improve a modular LED light such that it may be assembled in a simple manner and at the same time is simple to adapt in terms of the arrangement and number of LEDs.

SUMMARY

According to the invention, this modular LED light is distinguished in particular in that it may be used, for example, in explosive regions and has at least one LED module and one central power supply module, wherein at least the LED module is detachably attached to a housing module of the LED light. According to the invention, such a housing module has two arrangement planes in vertical directions, wherein at least power supply connectors for the LED lights and connection lines to the central power supply module and to the LED module are arranged in the upper arrangement plane and LED module and a driver device are arranged in the lower arrangement plane. Furthermore, the invention is distinguished in that the housing module has at least one LED module receiving element that is arranged lateral to the central power supply module and in which is arranged an LED power supply interface for supplying electrical power to the LED module in its usage position.

Due to the different arrangement planes, an LED module may be easily exchanged for another, or an LED module may be easily replaced, without the upper arrangement plane in which the corresponding electrical power supplies are arranged having to be accessed. This is also true for the driver device in the central power supply module, the driver device also being arranged in the lower arrangement plane. Each LED module is essentially supplied power automatically in its usage position using contacting of the LED power supply interfaces.

A ballast, for instance, in particular an electronic ballast, is included in the specific driver device, and this ballast may simply be arranged in the central power supply module or may be part of the central power supply module.

In order to essentially also reproduce the length of a fluorescent light using the modular LED light, LED module receiving elements having an appropriate LED power supply interface may be arranged on both sides of the central power supply module. Each LED module, in its usage position, is then connected to the LED light via the corresponding LED power supply interface. The two LED module receiving elements are embodied such that each LED module is arranged in the lower arrangement plane.

In this context, it has furthermore proved advantageous when the corresponding driver device is detachably attached to the central power supply module. Because of this, the driver device may also be exchanged in a simple manner and, where necessary, replaced with another driver device. The appropriate driver device is also arranged in the lower arrangement plane, so that in the inventive LED light all corresponding modules, that is, LED modules and driver device are accessible from the bottom of the light.

In order to change the lighting characteristics of an LED module in a simple manner, a plurality of LEDs may be arranged in the LED module, in particular as LED conductor cards. Such an LED conductor card is distinguished in that the LEDs are arranged directly on a corresponding conductor card with conductors.

There is the option of changing the number of LEDs, or even the conductor cards that carry the LEDs, in a simple manner, both in terms of the number and in terms of the arrangement. The LEDs can emit light in a different manner, for example as white light with different shades of white or even as light in an appropriate color or with different colors.

In order to be able to furthermore appropriately adjust the light output, a light focusing device for light distribution may be associated with each LED or each group of LEDs. In this way it is possible to realize different lighting scenarios, such as, for example, lighting that is already spread out or narrowed floodlight-type lighting. An appropriate focusing device may be a lens device associated with each LED and/or a reflector device.

In order to be able to manage and exchange each LED module in a simple manner, it may also be advantageous when each LED module has a module housing that is made in particular of a thermally conductive material and has a cover that is transparent or translucent in the light emission direction. In this context the cover may also be embodied such that it influences the light distribution.

If the corresponding module housing is made of a thermally conductive material, it is possible to do without, for example, additional heat output devices such as fins, ventilation slits, and the like. However, with such a material it is also possible, for example, for bar-shaped cooling elements to be provided on the surface, ventilation slits, and/or ventilation channels.

In the most simple case, the module housing may be made of a thermally conductive plastic material and, where necessary, may have cooling fins or the like, in particular on its exterior, where necessary for enhancing heat output. With the module housing, care should be taken that it is tightly closed and contains all LEDs and associated conductor cards so that it satisfies explosion prevention requirements.

In order in particular to protect such a module housing of the LED module from external damage, the LED module may have a second, in particular shell-shaped, protective housing in which the module housing is arranged.

To simplify the process of installing the LED module on the LED module, the LED module may be snapped into its usage position, wherein an articulated device is embodied between LED module and housing module. That is, first a corresponding contact is produced by LED module and housing module via the articulated device and then the LED module is pivoted or snapped into its usage position.

In one simple exemplary embodiment, the articulated device may be formed between an outer edge of the housing module or the LED module receiving element and a top of the protective housing. Because of this, for example the module housing is further protected and is not used for connecting to the housing module. That is, the protective housing may also be used for different module housings that may be correspondingly used in the in particular shell-shaped protective housing.

One simple option for an appropriate articulated device may be that, for example, at least one articulated hook for suspending on the outer edge of the housing module or the LED module receiving element as part of the housing module projects from a top of the protective housing, by means of which articulated hook the protective housing or LED module may be pivoted into its usage position, wherein in the usage position an electrical connection is produced between LED module and LED power supply interface.

The corresponding protective housing may in particular be embodied such that it is shock resistant and/or impact resistant. This improves the protection of the module housing and the parts disposed therein. In addition, the protective housing may protect the module housing from mechanical stresses when mounting the housing module or during use in the LED light.

If there is a need, for example, to mount a plurality of LED lights directly adjacent or at least nearly adjacent, it may furthermore be advantageous if continuous wiring for connecting to further LED lights or the like is provided in the upper arrangement plane of the housing module. That is, one LED light is connected directly to a voltage source, wherein the latter may be connected via this LED light to other LED lights using the continuous wiring.

For example, if two LED module receiving elements are provided and only one LED module is in use, it may furthermore prove advantageous if the corresponding module receiving element is embodied to receive a blank cover, a battery module, or the like. That is, the corresponding LED module receiving element may also be used for other parts to the arrangement in the lower arrangement plane.

In order to permit cooling of the LED light in a simple manner, in particular the housing module may have air inlets and/or cooling fins in the region of the central power supply module. As a rule, the LEDs produce relatively little heat, wherein appropriate cooling may be performed in particular in the location where the driver device is arranged for supplying power to the LEDs, specifically in the central power supply module.

When the LED light is used in an explosive region, modules and electrical connection may be embodied in appropriate types of protection against ignition. It may be advantageous when the manner in which the modules are embodied in terms of protection against ignition is “intrinsically safe” in connection with the driver device in the central power supply module. The “increased safety” type of protection against ignition may be selected for the electrical connections between the modules and the type of protection against ignition may be embodied as “increased security” or “flameproof enclosure” for corresponding power supply connectors and/or LED power supply interfaces.

In order to be able to control the LEDs in the corresponding LED module in different manners, the LEDs in such an LED module may be arranged and/or wired in series and/or parallel.

The light emitted may also be influenced in that, for example, the LEDs are provided by group in one plane or in a curved arrangement in the LED module. Naturally both arrangements may be used adjacent to one another in order to permit different light distribution characteristics, for example.

It has already been indicated that a corresponding LED module is pivoted into its usage position. In order to secure this usage position of the LED module, the LED module may be detachably fixed in the usage position in particular using a locking device. One simple example of such a locking device is the use of at least one screw or the like in order to join, for example, the protective housing of the LED module to the LED module receiving element. This occurs without any effect on the module housing.

In this context, it may also prove advantageous if there is an interruption in voltage in a corresponding locking device and in particular when the latter is released, so that, for example, the locking device is coupled to a voltage interruption device.

It has already been mentioned that a cooling device, in the form of air inlets or cooling fins, may be provided in particular in the region of the central power supply module. To enhance this cooling, where necessary the central power supply module may have a cooling device. This cooling device may be active or passive. An active cooling device would be cooling using an electronic element, for instance, like Peltier cooling, and passive cooling may be embodied, for example, in a honeycomb structure.

In the present invention, providing an upper and lower arrangement plane is an advantage. To decouple these arrangement planes electrically even further, a separating metal sheet may be embodied between the first and second arrangement. This improves electromagnetic compatibility (EMC), for example.

It has already been indicated that the driver device may also be detachably arranged on the central power supply module. If such a driver device is not necessary as a separate part or is contained in an LED module, for example, it may also prove advantageous when the central processing module is embodied for receiving an additional LED module. In the simplest scenario, other LED modules may be arranged instead of the driver device.

With respect to the locking device, the use of one or a plurality of fastening screws that join the protective housing to the LED module or to the LED module receiving element has already been addressed. However, other locking devices are also possible, such as, for example, a locking rod that is pivotably mounted in the protective housing and that may be engaged with locking eyelets projecting from the LED module receiving element. That is, the locking rod is accessible from the outside and may be pivoted into a different position so that in a first pivot position it is engaged with the locking eyelets and in another pivot position it is disengaged. The LED module may be fixed in its usage position by pivoting the locking rod from the outside.

In order to improve the cooling of the LED modules, the housing module may have air slits/openings and or air conducting devices embodied between LED module and module housing, for instance air conducting fins, embodied in the region of the central power supply module and oriented in the direction of the LED module and in particular in the direction of openings in the protective housing. The air may exit at the ends or on the sides of the module housing, i.e. cooling air may be introduced at least into the protective housing from the central power supply module and where necessary may be output into the surroundings from there via further air outlet openings.

BRIEF DESCRIPTION OF THE DRAWINGS

Advantageous exemplary embodiments of the invention shall be described in greater detail using the figures in the attached drawings.

DETAILED DESCRIPTION OF THE DISCLOSURE

Figure 1:
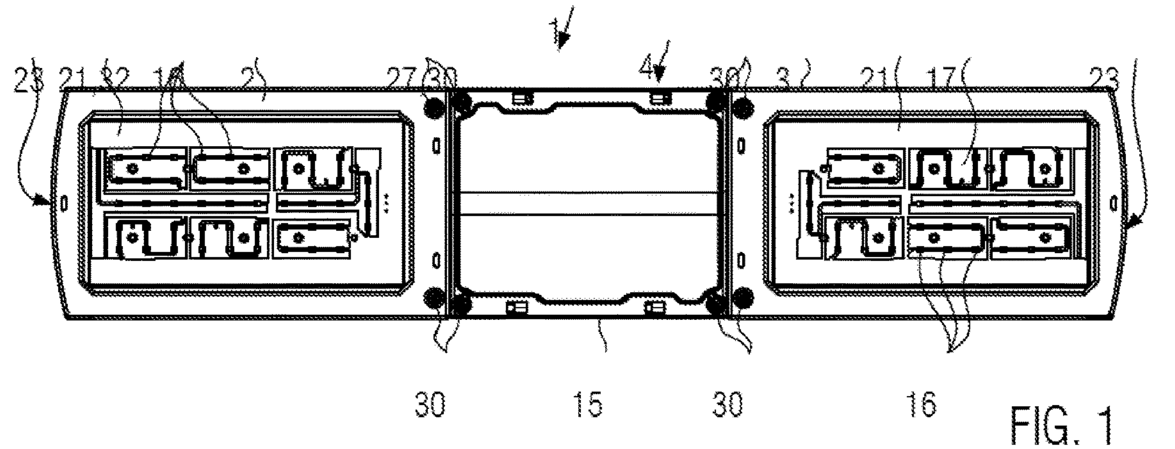
FIG. 1 is a bottom view of one exemplary embodiment of an inventive module LED light.

FIG. 1 depicts a bottom view of an LED light 1 according to the invention having two lateral LED modules 2, 3. Each of the modules is arranged laterally with respect to a central power supply module 4. They are all joined to a housing module 5, for example using fastening screws 30 (see also FIGS. 2 and 3). A plurality of LEDs 16 may be seen in each or the LED modules 2, 3 through an opening and through a corresponding transparent or translucent cover 21. The LEDs are arranged on different LED conductor cards 17. The two LED modules 2, 3 are embodied identically with respect to the arrangement number of their LEDs 16. Different arrangements of these LEDs or LED conductor cards or different numbers thereof are also possible.

On its top side 24 each LED module has an articulated device 23 (see also FIGS. 2 and 3) that provides initial coupling on the housing module 5. Then the LED modules 2, 3, in their seated position 13 depicted in FIGS. 1 through 3, may be pivoted toward the housing module 5 and fixed in their usage position using an appropriate locking device 27, in this case fastening screws 30.

Figure 2:
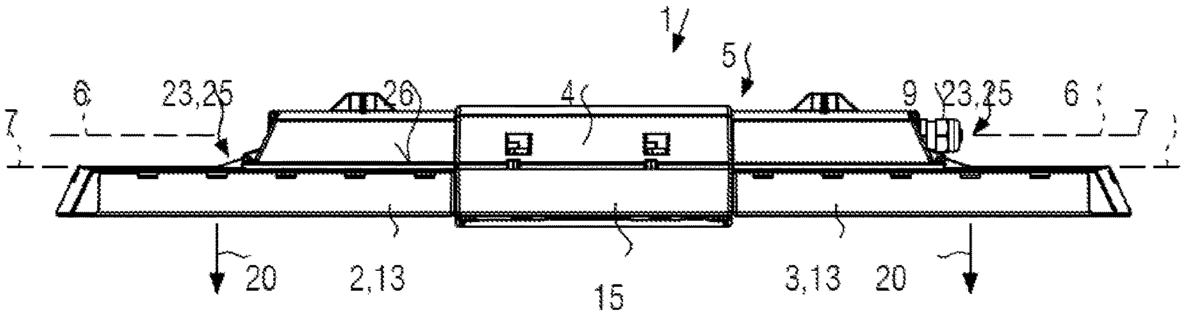
FIG. 2 is a side view of the LED light from FIG. 1.
Figure 3:
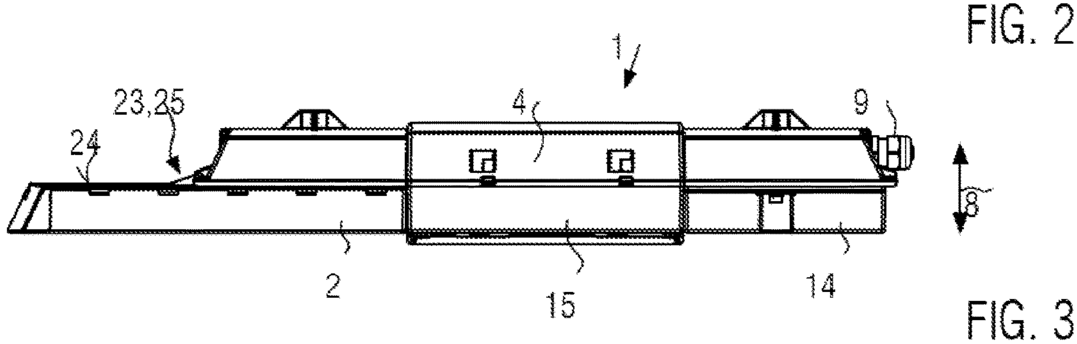
FIG. 3 is a side view as in FIG. 2 having an LED module.

FIGS. 2 and 3 depict the LED light according to FIG. 1 in a side view, wherein in FIG. 3 an LED module 3 is removed and replaced with a cover. Moreover, in FIGS. 2 and 3 the housing module 5 for the LED light 1 may be seen. It extends, by means of corresponding LED module receiving elements 11 and 14, to both sides of the central power supply module 4 as part of the housing module 5. The LED module receiving elements 11 and 14 cover about half of a top side 24 of each LED module 2, 3, wherein in this region it has an opening.

The locking device 27 is arranged between the top 24 of each LED module 2, 3 and an outer edge 26, in particular of LED module receiving elements. In the exemplary embodiment depicted, it comprises at least one articulated hook 25 that overlaps the outer edge 26.

Moreover, it may be seen in particular in FIG. 2 that the LED light has an upper arrangement plane 6 and a lower arrangement plane 7. Power supply connections and connection lines 10 are provided in the upper arrangement plane 6 (see also FIG. 12), wherein the LED modules 2, 3 and the driver device 15 are arranged in the lower arrangement plane. The two arrangement planes 6, 7 are arranged spaced apart from one another in the vertical direction 8.

Furthermore, corresponding power supply connections 9 may be see on the housing module 5. They permit insertion of connection lines from a voltage source in the central power supply module. The corresponding connection lines within the housing module 5 may also be passed through, i.e., may be guided out on the other side of the housing module 5 and may be used for connecting other LED lights 1 or the like.

Figure 4:
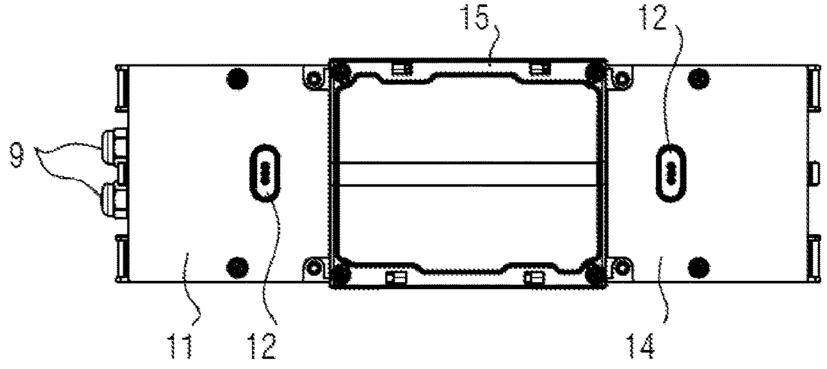
FIG. 4 is a view as in FIG. 1 without LED module.

FIG. 4 is a bottom view of the housing module 5 without LED modules 2, 3. In particular it may be seen that the two LED module receiving elements 11 and 14 have an electrical plug connection in the form of an LED power supply interface 12. It connects electrically to the LED module and supplies power to the LEDs or LED conductor cards.

The driver device 15 is provided in the central power supply module 4 according to FIG. 4.

In addition, it may be seen from FIGS. 2 and 3 that essentially the LED modules 2, 3 and the driver device 15 terminate approximately in one plane below the housing module 5, wherein only the driver device projects somewhat downward.

Figure 5:
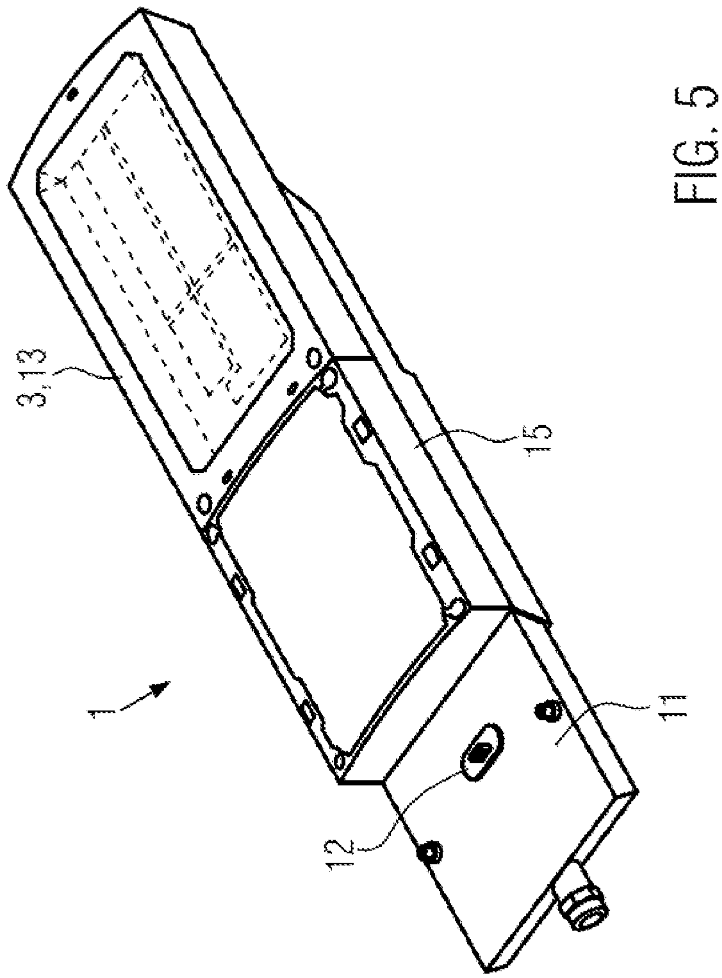
FIG. 5 is a perspective top view onto a bottom of the LED light having an LED module and driver device in the central power supply module.
Figure 6:
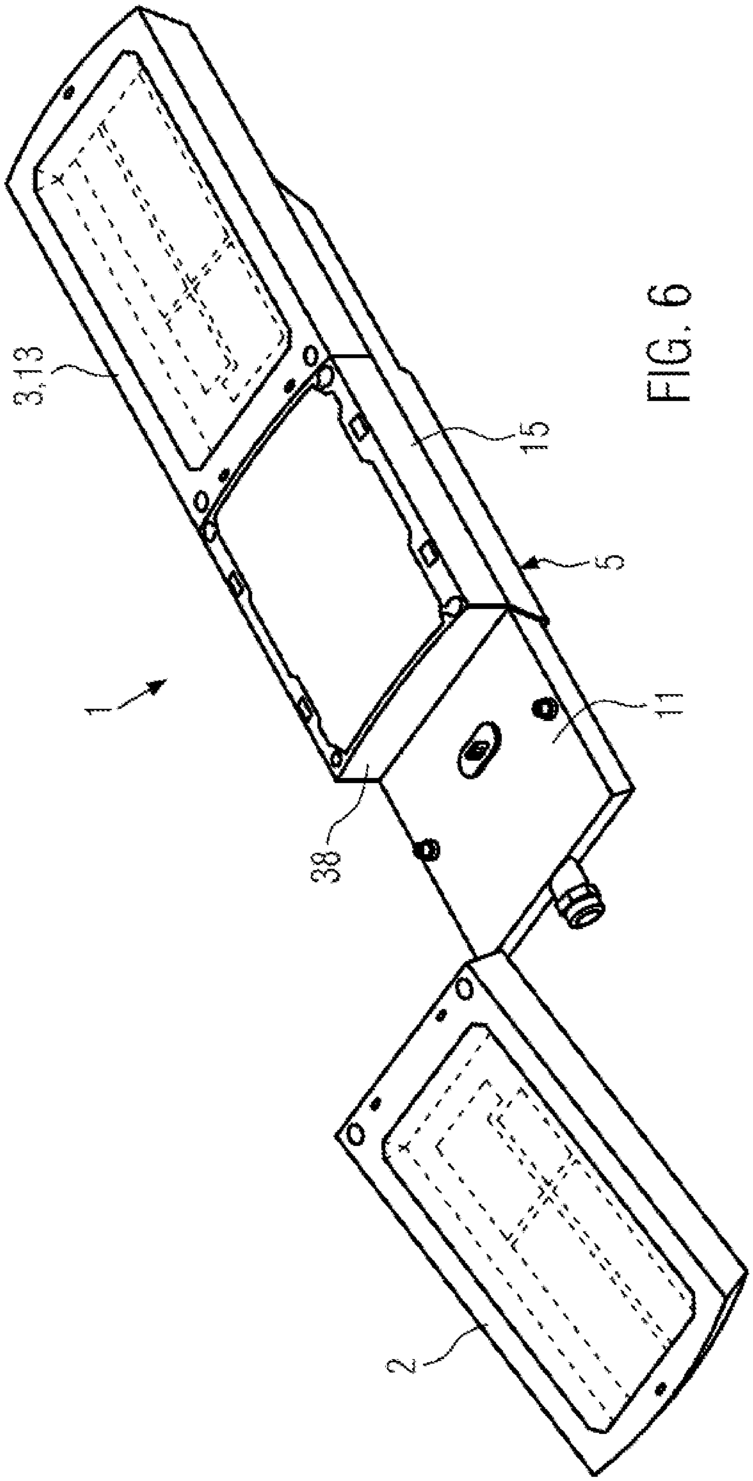
FIG. 6 is the light according to FIG. 5 having an additional LED module.
Figure 7:
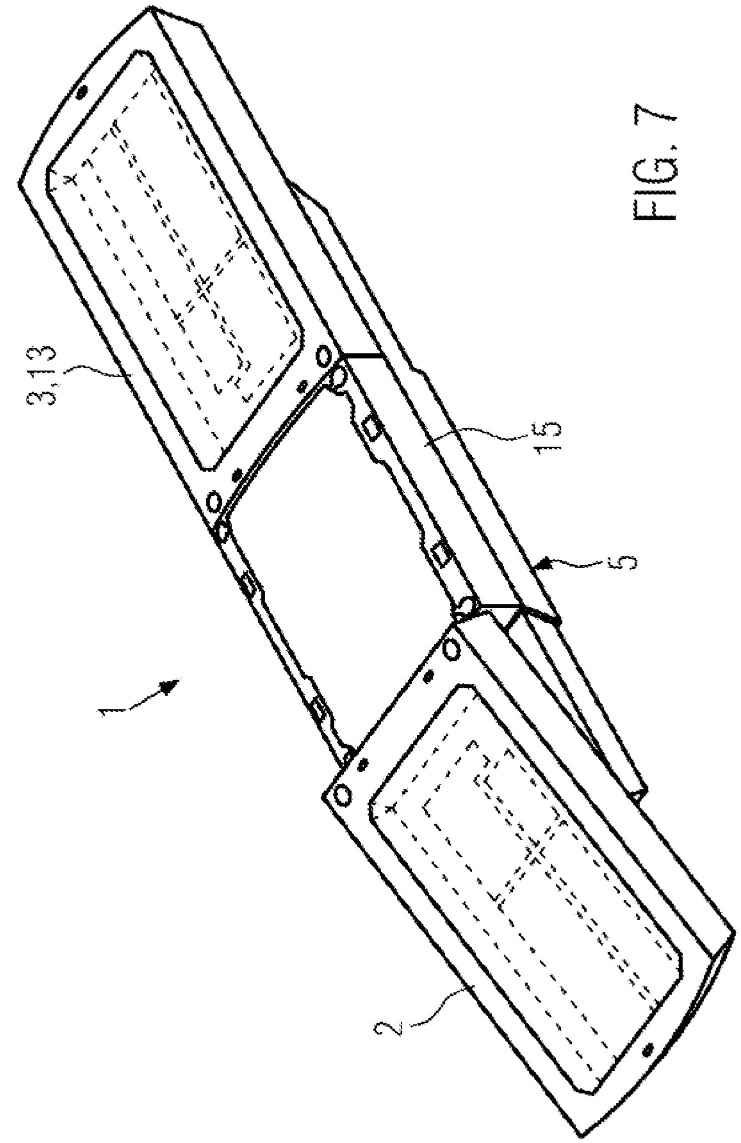
FIG. 7 is the light according to FIG. 6 having the additional LED module in the usage position, coupled by means of an articulated device.

FIG. 5 depicts the LED light according to the preceding figures in particular with an empty LED module receiving element 11 into which a corresponding LED module 2 is then inserted in the following FIGS. 5 and 6. To this end, the LED module 2 according to FIG. 6 is moved towards the LED module receiving element and hooked via the articulated device 23, with the engagement of the articulated hook 25, to the outer edge 26 and then pivoted into the usage position (see the other LED module 3 in FIGS. 5 through 7). The LED module 2 is then fixed in this usage position 13 using a locking device 27 in the form of the aforesaid fastening screw 30. When the LED module 2 is pivoted into place, a connection interface 41 of the LED module 2 is correspondingly connected electrically to the LED power supply interface 12.

Figure 8:
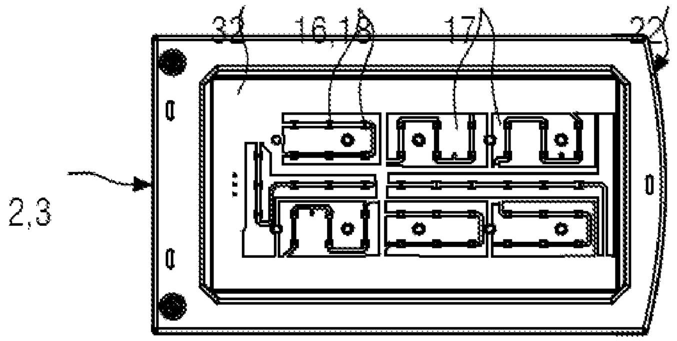
FIG. 8 is a top view of an LED module.
Figure 9:
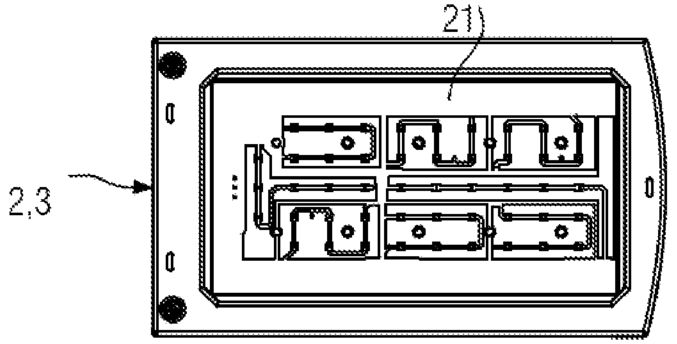
FIG. 9 is a top view as in FIG. 8 of another LED module.
Figure 10:
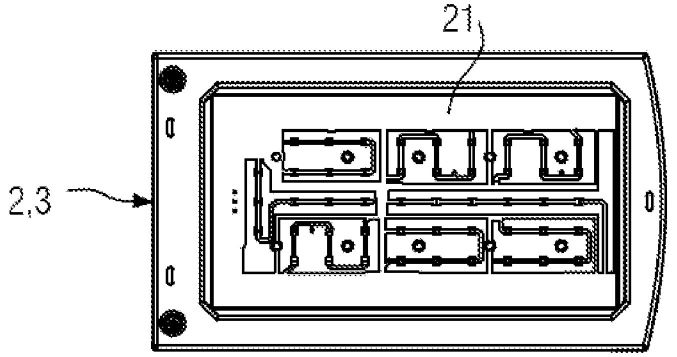
FIG. 10 is a top view as in FIG. 8 of another LED module.

FIGS. 8 through 10 depict different exemplary embodiments of numbers of LEDs 16 for an LED module 2 or 3. It is also possible to provide a different number or arrangement of LED conductor cards 17. The different LEDs 16 may be used in the provided positions so that the corresponding LED conductor cards 17 may be fitted, for example, with 24, 36 or 48 LEDs. Other numbers are also possible.

Moreover, a light focusing device 18, which in the depicted exemplary embodiments 8 through 10 is associated with each LED in the form of a lens device, is associated with each LED or a group of LEDs.

It is also possible, for example, for the LEDs of a conductor card to be provided with a corresponding light focusing device 18 or for the transparent or translucent cover 21 alternatively or additionally to be embodied, at least at specific locations, as a corresponding light focusing device 18. Alternatively, the light focusing device may be formed by a reflector.

Figure 11:
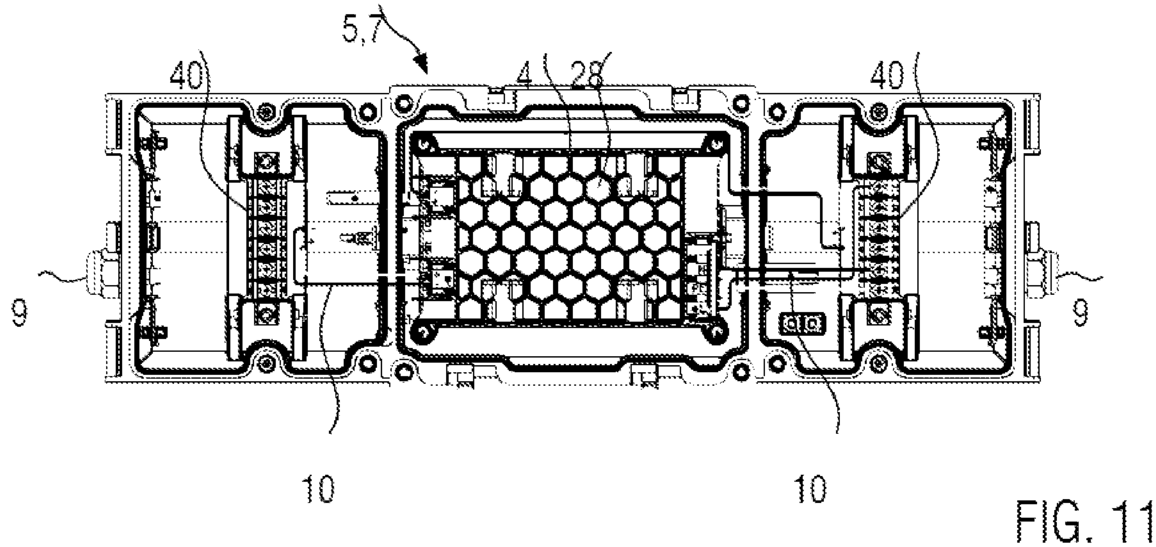
FIG. 11 is a view as in FIG. 1 of an LED light and in particular of a housing module without LED module and with driver device.
Figure 12:
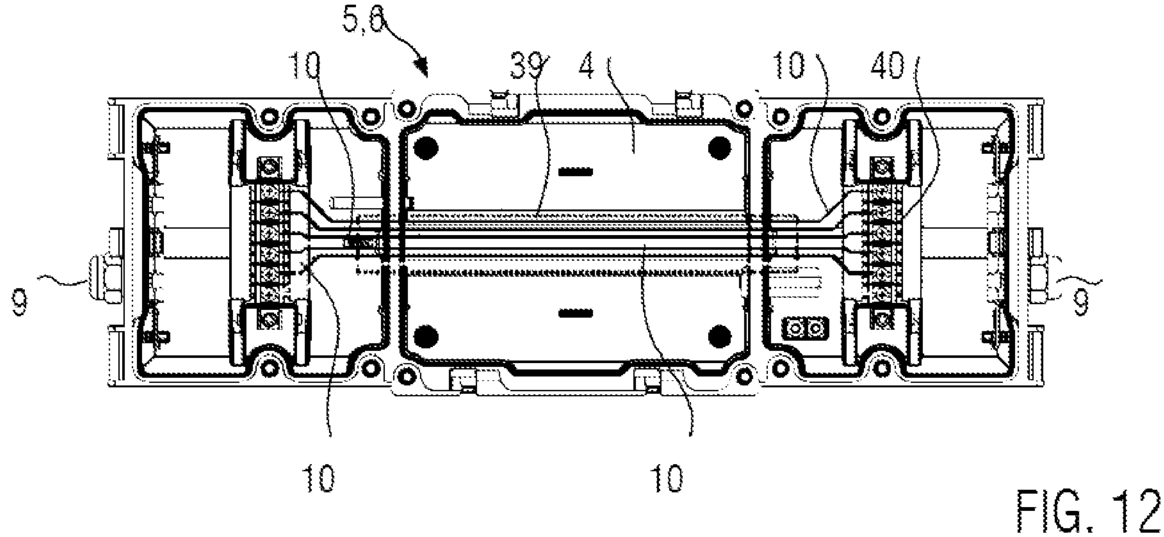
FIG. 12 is a view as in FIG. 11 without driver device.

FIGS. 11 and 12 depict two sections through the LED light according to FIG. 4. These sections are disposed approximately in the lower arrangement plane 6 (see FIG. 12) or in the upper arrangement plane 7 (see FIG. 11).

How the corresponding power supply connections 9 and connection lines 10 run in the upper arrangement plane 6 may be seen in particular in FIG. 12. The power supply connections 9 are arranged on both sides of the housing module 5, so that in particular a line may pass through continuously to adjacent LED lights. The corresponding power supply lines 10 are arranged in a tube bushing 39 in the region of the central power supply module 4. The connection lines are then attached on both sides of the tube bushing 10 to connection clamps 40 that are embodied as power supply terminal clamps and supply power to the driver device by means of a plugin device or the like. Power is supplied to the LED power supply interface 12 from the driver device. In addition, it may be seen in the figures that the driver device 15 has a cooling device 28 in the form of a honeycomb structure. On the one hand, it increases the stability of the and, on the other hand, it conducts heat away from the driver device. The latter may be attached in the central power supply module 4, for example, by means of screws.

The specific connections are embodied with appropriate types of protection against ignition for explosive regions. For example, the outputs of the driver devices may be embodied with the "intrinsic safety" and/or "increased safety" type of protection against ignition in order to provide different LED modules with different capacities. The LED modules be embodied in the "increased safety" type of protection against ignition, wherein electrical circuits of the LED modules may also be embodied in the "intrinsic safety" type of protection against ignition. The connection elements are embodied, for example, in the "increased safety" or "flame-proof" type of protection against ignition.

With respect to the LED conductor cards, it should also be noted that these may be switched both in series or parallel with one another. The light output is increased or decreased by varying the number of LEDs. Using the arrangement of the LEDs and the appropriate light focusing device it is possible to change the light distribution at a certain distance in the direction of light radiation 20 (see also FIG. 2). One example is wide illumination for a relatively large region or even a narrow radiation region in the form of a floodlight. It is also possible for the appropriate LED conductor cards or the LED modules themselves, as well, to be curved in order to permit a different light distribution.

Even in such curved LED modules, at least two regions of the LED modules are embodied identically in order, on the one hand, to embody the articulated device 23 and, on the other hand, to be able to produce the electrical connection to the LED power supply interfaces.

Figure 13:
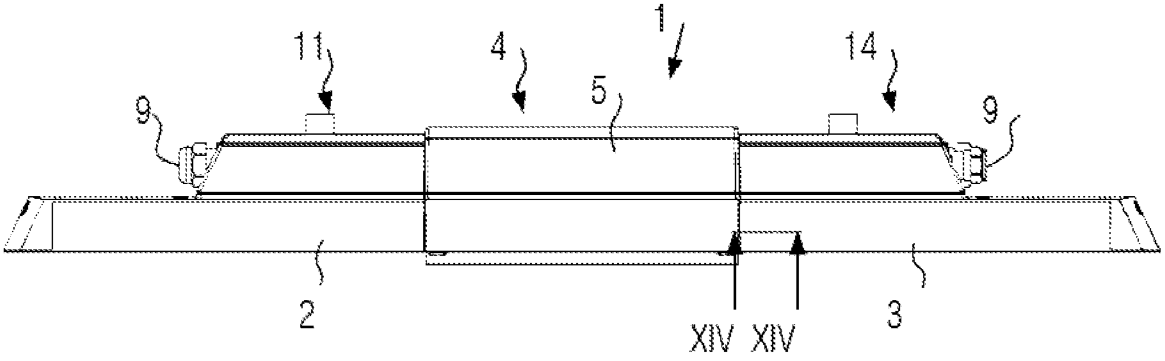
FIG. 13 is a side view of the LED light as in FIG. 2.

FIG. 13 is a side view, analogous to FIG. 3, wherein in particular the power supply connections 9 project bilaterally from the housing module 5. Two LED modules 2, 3 are arranged on a bottom of the housing module 5 and the driver device 15 is arranged between them in the region of the central power supply module 4.

Figure 14:
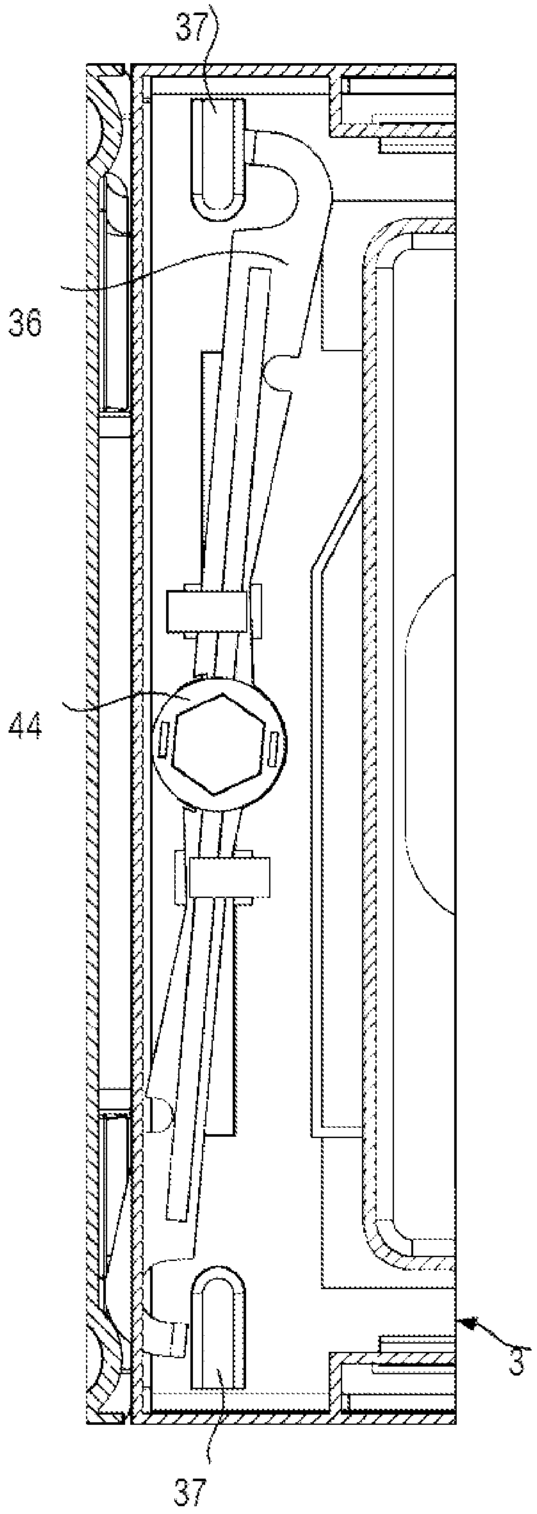
FIG. 14 is a section along the line XIV-XIV in FIG. 13.

FIG. 14 is a section along the line XIV-XIV in FIG. 13 and illustrates in particular a specific embodiment of the locking device 27 for fixing an LED module 2, 3 in its usage position. The locking device 27 according to FIG. 14 comprises a locking rod 36 pivotably borne in the LED module. In FIG. 14 the locking rod is shown with its hook-like ends pivoted out of its engaged position, so that they are not engaged with locking eyelets 37. The latter project towards the LED module from the corresponding LED module receiving element and project through the corresponding opening on the top of the protective housing.

If the locking rod 37 is pivoted counterclockwise through the outside use of a tool on the engagement head 44, the locking rods engage with the corresponding locking eyelets 37, so that the LED module 2 is fixed in its usage position. Reversing this process releases this usage position and the LED module.

Figure 15:
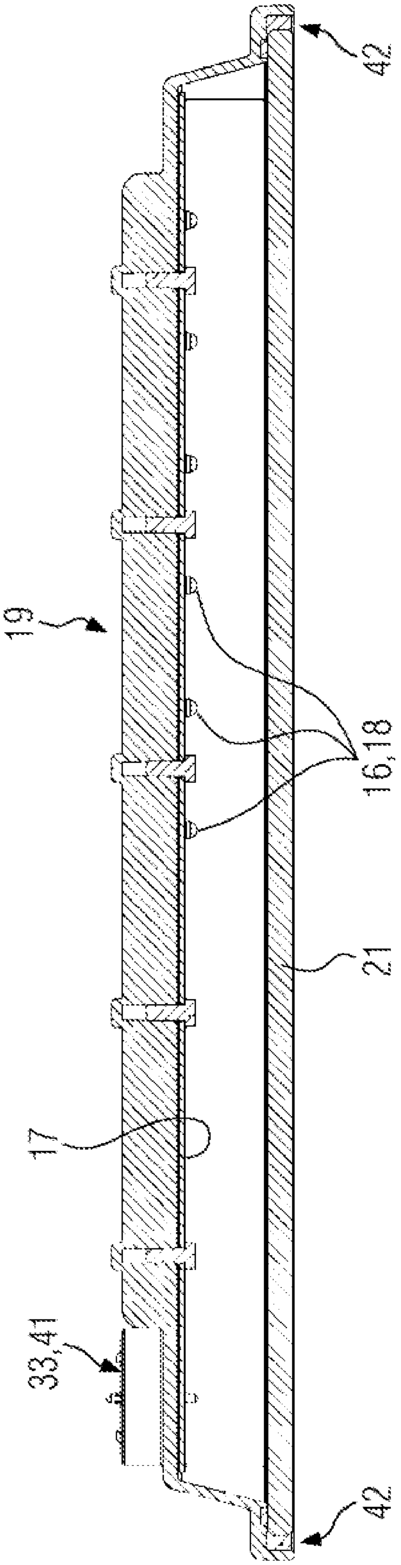
FIG. 15 is a longitudinal section through a module housing of an LED module; and, FIG. 16 is a longitudinal section as in FIG. 15 through protective housing of the LED module with inserted module housing.
Figure 16:
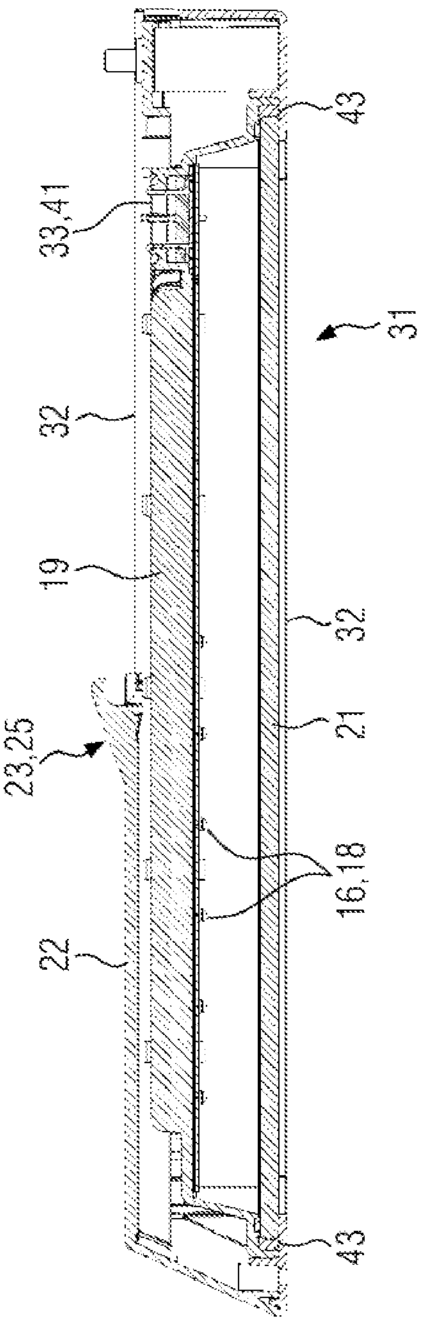

FIGS. 15 and 16 depict a longitudinal section through an LED module. It essentially comprises two housings. FIG. 15 depicts a first housing (see module housing 19). It is sealed and in particular made of a thermally conductive material, in particular a plastic material. Embodied on the top of the module housing 19 is a connection device 33 in the form of a connection interface 41 that engages with the LED power supply interface 12 when the LED module is in the usage position (see also FIG. 6). This is how the LEDs may be supplied with power by the central power supply module 4 and in particular by the driver device 15.

The corresponding conductor cards 17 are fitted with a number of LEDs, wherein in this case an appropriate light focusing device 18 is associated with each LED 16. The module housing 19 is somewhat shell-shaped and has a cover 21 that closes a corresponding opening of the module housing. Seals 42 are arranged along edges of the cover 21.

In FIG. 16, the module housing 19 is arranged in another somewhat shell-shaped or trough-shaped protective housing 22 of the LED module. This protective housing 22 housing has on its top the opening 32 that is closed by the corresponding LED module receiving element when the LED module is in the usage position. The opening 32 ensures that, for instance, LED power supply interface and connection interface 41 can come into electrical contact with one another.

Embodied on the top of the protective housing is at least one corresponding articulated hook 25 that is part of the articulated device 23 and that overlaps an outer edge in particular of the LED module receiving element 11 (see also FIGS. 2 and 3). The LED module may be pivoted about this articulated hook 25, for instance out of the position according to FIG. 7, into the usage position. There the LED module is then fixed using the locking device 27 in the form of fastening screws 30 or in the form of the locking rod 36 (see FIG. 14)

According to the invention, a modular LED light is provided that may be used in particular in explosive areas. All LEDs are housed in a sealed manner in their module housing and arranged in the corresponding protective housing with the module housing. This LED module put together in this manner may be arranged in the corresponding LED module receiving element 11 or 14 and may be fixed there in its usage position. The protective housing in particular provides protection from shocks and impacts and also from mechanical stresses, for instance after being installed in the housing module 5.

It is also possible to use the LED module receiving element 11 or 14 for arranging a blind cover, a battery, or other parts, instead of for an LED module 2 or 3. Likewise, instead of the driver device, it is possible to arrange another LED module on the central power supply module 4. In this case the driver device may be contained in an LED module, for example.

The protective housing is produced from a thermally conductive plastic material in order to appropriately draw heat away from the internal devices. This removal of heat may be improved, for example, using cooling fins on the protective housing and/or on the module housing. With respect to the articulated hook, it should be noted that as a rule more than one articulated hook is used, i.e., in particular two, three, or more articulated hooks are used.

With respect to the locking device 27, it should be noted that the latter may be coupled to a voltage interrupting device so that a voltage supply is only interrupted when an LED module is detached using the locking device. Conversely, a voltage supply is not restored unless the locking device is in its final locked position.

The honeycomb structure may be part of a housing of the central power supply module 4 in which the driver device may be used (see for example FIGS. 1 through 3 or FIG. 11 and FIG. 12) or this honeycomb structure is part of the driver device in order to reinforce in particular a housing belonging thereto.

Thus, according to the invention an LED light is provided that may be a replacement for fluorescent tubes and that is constructed modularly in order to be variable both with respect to quantity of light and light distribution. In addition, only the corresponding LED modules are exchanged and/or changed in their number. Moreover, each LED module may be fitted with LEDs differently. Between one and three LED modules may be used in the inventive LED light.

What is claimed is:

1. A modular LED light for explosive areas comprising:

a housing module including a central power supply module, at least one LED module receiving element enclosing internal electronics, and an LED power supply interface arranged on the LED module receiving element; and at least one LED module configured to be detachably attached to the housing module by a snap-fit connection, the LED power supply interface supplying electrical power to the at least one LED module when the at least one LED module is attached to the housing module in a usage position, a plurality of LEDs being arranged in the at least one LED module, the LEDs being disposed outside of the LED module receiving element.

2. The modular LED light according to claim 1, further comprising a driver device enclosing internal electronics, wherein the central power supply module encloses internal electronics and is detachably connected to the driver device.

3. The modular LED light according to claim 2, wherein a light focusing device for light distribution is associated with each LED, and the at least one LED module has a module housing made of a thermally conductive plastic material and has a cover that is transparent or translucent in the light emission direction.

4. The modular LED light according to claim 3, wherein the module housing has cooling fins and the at least one LED module has a second, shell-shaped, protective housing in which the module housing is arranged.

5. The modular LED light according to claim 4, wherein the at least one LED module is snapped into the usage position and an articulated device is embodied between the at least one LED module and housing module and the articulated device is formed between an outer edge of the housing module and a top of the protective housing, wherein there is at least one articulated device.

6. The modular LED light according to claim 5, wherein at least one articulated hook for suspending on the outer edge of the housing module of the LED module receiving element projects from the top of the protective housing, the articulated hook configures the at least one LED module to be pivoted into the usage position, wherein in the usage position an electrical connection is produced between the at least one LED module and the LED power supply interface, and wherein the protective housing is one of shock resistant and impact resistant.

7. The modular LED light according to claim 1, wherein the at least one LED module receiving element is configured for receiving a battery module.

8. The modular LED light according to claim 1, wherein the at least one LED module is configured as "intrinsically safe" for protection against ignition, and an electrical connection between the at least one LED module and the central power supply module is configured as an "increased safety" type for protection against ignition, and the central power supply module is configured as a "powder filling" type for protection against ignition.

9. The modular LED light according to claim 1, wherein the central power supply module has output current circuits for the at least one LED module that are intrinsically safely limited in power and in at least one of voltage and current, wherein at least one of a power supply connection and the LED power supply interface is configured as an "increased security" or "flame-proof enclosure" type for protection against ignition.

10. The modular LED light according to claim 4, wherein the LEDs are arranged in the at least one LED module wired in one of series and parallel, and wherein the LEDs are provided by group in one plane or in a curved arrangement in the at least one LED module, and wherein the at least one LED module is detachably fixed in the usage position using a locking device.

11. The modular LED light according to claim 10, wherein the locking device is coupled to a voltage interruption device.

12. The modular LED light according to claim 10, wherein the central power supply module has a cooling device.

13. The modular LED light according to claim 10, wherein the driver device has a honeycomb structure.

14. The modular LED light according to claim 10, wherein the locking device is formed by one or a plurality of fastening screws that joins the protective housing to the at least one LED module receiving element.

15. The modular LED light according to claim 10, wherein the protective housing has a light outlet opening associated with the cover of the module housing.

16. The modular LED light according to claim 15, wherein a top of the protective housing has an opening through which the LED power supply interface and a connection device of the module housing are brought into contact.

17. The modular LED light according to claim 15, wherein the at least one LED module and central power supply module with the driver device terminate in a common horizontal plane on a bottom of the LED light.

18. The modular LED light according to claim 10, wherein the locking device comprises a closing rod configured to be brought into engagement with a locking eyelet projecting from the at least one LED module receiving element, and wherein the housing module has air slits oriented towards the at least one LED module and towards openings in the protective housing.

19. The modular LED light according to claim 18, further comprising connection clamps embodied as power supply terminal clamps on one or both sides of the central power supply module, and wherein the closing rod has an engagement head for engaging a tool.

20. A modular LED light for explosive areas comprising a housing module including a central power supply module, at least one module receiving element enclosing internal electronics, and a power supply interface arranged on the module receiving element, the module receiving element selectively and detachably receiving an LED module and a battery module at a bottom surface of the module receiving element, the power supply interface supplying electrical power to the LED module or battery module when the LED module or battery module is attached to the module receiving element in a usage position, the light further comprising a driver device enclosing internal electronics, wherein the central power supply module encloses internal electronics and is detachably connected to the driver device.

* * * * *